(12) United States Patent
Prabhu Kholkar et al.

(10) Patent No.: US 11,055,200 B2
(45) Date of Patent: Jul. 6, 2021

(54) SYSTEMS AND METHODS FOR VALIDATING DOMAIN SPECIFIC MODELS

(71) Applicant: Tata Consultancy Services Limited, Mumbai (IN)

(72) Inventors: Deepali Prabhu Kholkar, Pune (IN); Dushyanthi Mulpuru, Pune (IN); Vinay Vasant Kulkarni, Pune (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 0 days.

(21) Appl. No.: 16/599,517

(22) Filed: Oct. 11, 2019

(65) Prior Publication Data

US 2020/0117575 A1 Apr. 16, 2020

(30) Foreign Application Priority Data

Oct. 12, 2018 (IN) .............................. 201821038854

(51) Int. Cl.
*G06F 11/36* (2006.01)
*G06F 8/35* (2018.01)

(52) U.S. Cl.
CPC ............ *G06F 11/3608* (2013.01); *G06F 8/35* (2013.01); *G06F 11/3688* (2013.01); *G06F 11/3692* (2013.01)

(58) Field of Classification Search
None
See application file for complete search history.

(56) References Cited

U.S. PATENT DOCUMENTS 6,789,252 B1 9/2004 Burke et al.
8,301,627 B2 * 10/2012 Begue .................... G06Q 30/06
707/736

(Continued)

OTHER PUBLICATIONS

Linehan, Mark H. "SBVR use cases." International Workshop on Rules and Rule Markup Languages for the Semantic Web. Springer, Berlin, Heidelberg, 2008. (Year: 2008).*

(Continued)

*Primary Examiner* — Matthew J Brophy
(74) *Attorney, Agent, or Firm* — Finnegan, Henderson, Farabow, Garrett & Dunner LLP (57) ABSTRACT

Model driven engineering (MDE) approaches necessitate verification and validation (V&V) of the models used. Balancing usability of modeling languages with verifiability of the specification presents several challenges. Conventional modeling languages have automated solvers but are hard to interpret and use. Implementations of present disclosure provide systems and methods for validating domain specific models wherein rules and vocabularies in domain specific model are translated to machine interpretable rules (MIR) and machine interpretable vocabularies (MIV) which are processed (via logic programming technique) to generate a logic programming representation (LPR) of the MIR and MIV based on which solution scenarios are generated for validating the domain specific model. Validation of the model involves verifying LPR using a set of ground facts. During validation of solution scenarios of model, system also checks for inconsistences in rules, if any. These rules are corrected and solution scenarios are re-generated to obtain anomaly free solution scenarios.

15 Claims, 3 Drawing Sheets

(56) References Cited

U.S. PATENT DOCUMENTS

| | | | |
|---|---|---|---|
| 8,495,580 B2* | 7/2013 | Gowri | G06F 11/3608 717/126 |
| 9,798,975 B2* | 10/2017 | Citeau | G06N 5/025 |
| 10,346,140 B2* | 7/2019 | Johnson | G06F 11/3608 |
| 2007/0112718 A1 | 5/2007 | Liu et al. | |
| 2007/0288412 A1* | 12/2007 | Linehan | G06Q 10/06 706/45 |
| 2008/0313008 A1 | 12/2008 | Lee et al. | |
| 2010/0082415 A1* | 4/2010 | Begue | G06Q 30/0208 705/14.11 |
| 2010/0114628 A1 | 5/2010 | Adler et al. | |
| 2011/0252406 A1* | 10/2011 | Gowri | G06F 11/3608 717/126 |
| 2014/0195473 A1* | 7/2014 | Citeau | G06N 5/022 706/47 |
| 2017/0039039 A1* | 2/2017 | Johnson | G06F 8/20 |
| 2018/0005123 A1* | 1/2018 | Lagos | G06N 5/046 |
| 2018/0150379 A1* | 5/2018 | Ratiu | G06F 11/3608 |
| 2019/0073426 A1* | 3/2019 | Balduccini | G06F 16/24578 |
| 2019/0333164 A1* | 10/2019 | Fox | G06Q 10/00 |

OTHER PUBLICATIONS

Roychoudhury, Suman, et al. "From natural language to SBVR model authoring using structured English for compliance checking." 2017 IEEE 21st International Enterprise Distributed Object Computing Conference (EDOC). IEEE, 2017. (Year: 2017).*

Giordano, Laura, et al. "Business process verification with constraint temporal answer set programming." Theory Pract. Log. Program. 13.4-5 (2013): 641-655. (Year: 2013).*

Almendros-Jiménez, Jesús M., and Luis Iribarne. "ODM-based UML model transformations using Prolog." International Workshop on Model-Driven Engineering, Logic and Optimization: friends or foes. 2011. (Year: 2011).*

Casella, Giovanni, and Viviana Mascardi. "West2east: exploiting web service technologies to engineer agent-based software." International Journal of Agent-Oriented Software Engineering 1.3-4 (2007): 396-434. (Year: 2007).*

Lifschitz, Vladimir. "Answer set programming and plan generation." Artificial Intelligence 138.1-2 (2002): 39-54. (Year: 2002).*

* cited by examiner

SYSTEMS AND METHODS FOR VALIDATING DOMAIN SPECIFIC MODELS

PRIORITY CLAIM

This U.S. patent application claims priority under 35 U.S.C. § 119 to Indian Application No. 201821038854, filed on Oct. 12, 2018. The entire contents of the aforementioned application are incorporated herein by reference.

TECHNICAL FIELD

The disclosure herein generally relates to verification and validation techniques, and, more particularly, to systems and methods for validating domain specific models.

BACKGROUND

Model driven engineering (MDE) approaches seek to enable development of large, complex systems using models as basis, necessitating verification and validation (V&V) of the models. Information about the problem domain in terms of vocabulary and business rules of the domain needs to be captured as the first step in model building. Correctness of the model needs to be established before using the model for artifact generation. Balancing usability of modeling languages with verifiability of the specification presents several challenges.

Further it is desirable that models be populated directly by subject matter experts (SMEs) to minimize errors and provide them with greater control over specification. It is also well known that usability and verifiability are two key requirements from modeling languages. However when it comes to populating model, it is found that modeling languages that are easy to use by SMEs are less formal, and therefore harder to verify (e.g., Unified Modeling Language (UML)). On the other hand, formal modeling languages such as Alloy, Kodkod, CSP, and SAT specification languages that have automated solvers available but are hard for SMEs to use.

SUMMARY

Embodiments of the present disclosure present technological improvements as solutions to one or more of the above-mentioned technical problems recognized by the inventors in conventional systems. For example, in one aspect, there is provided a processor implemented method for validating domain specific models. The method comprises receiving, via one or more hardware processors, a domain specific model comprising one or more rules and one or more vocabularies, wherein the one or more vocabularies comprise a plurality of entities and associated relationship thereof; translating, via the one or more hardware processors, the one or more rules and the one or more vocabularies into one or more machine interpretable rules and one or more machine interpretable vocabularies; processing, via the one or more hardware processors, the machine interpretable rules and the machine interpretable vocabularies to generate a logic programming representation comprising the machine interpretable rules and the machine interpretable vocabularies; generating, via the one or more hardware processors, one or more solution scenarios of the logic programming representation; and validating, via the one or more hardware processors the domain specific model using the one or more solution scenarios.

In an embodiment, the step validating the domain specific model using the one or more solution scenarios comprises: verifying the logic programming representation comprising the machine interpretable rules and the machine interpretable vocabularies using a set of test cases comprising at least one of one or more positive and one or more negative test cases represented as ground facts; performing, using test data from the ground facts, a comparison of the one or more solution scenarios with one or more reference solution scenarios; and validating, based on the comparison, results of the one or more solution scenarios and the domain specific model thereof.

In an embodiment, the step of validating results of the one or more solution scenarios comprises determining, using the logic programming representation, one or more inconsistencies across the one or more rules in the domain specific model.

The method may further comprises correcting the one or more determined inconsistencies and re-generating the one or more solution scenarios to obtain one or more anomaly-free solution scenarios. In an embodiment, the step of correcting the one or more determined inconsistencies comprises performing a conflict resolution check across the one or more rules.

In another aspect, there is provided a system for validating domain specific models. The system comprises a memory storing instructions; one or more communication interfaces; and one or more hardware processors coupled to the memory via the one or more communication interfaces, wherein the one or more hardware processors are configured by the instructions to: receive a domain specific model comprising one or more rules and one or more vocabularies, wherein the one or more vocabularies comprise a plurality of entities and associated relationship thereof; translate, using an editor, the one or more rules and the one or more vocabularies into one or more machine interpretable rules and one or more machine interpretable vocabularies; process, using a model-based generation technique, the machine interpretable rules and the machine interpretable vocabularies to generate a logic programming representation comprising the machine interpretable rules and the machine interpretable vocabularies; generate, using a solver, one or more solution scenarios of the logic programming representation comprising the machine interpretable rules and the machine interpretable vocabularies; and validate the domain specific model using the one or more solution scenarios.

In an embodiment, the domain specific model is validated by: verifying the logic programming representation comprising the machine interpretable rules and the machine interpretable vocabularies using a set of test cases comprising at least one of one or more positive and one or more negative test cases represented as ground facts; performing, using test data from the ground facts, a comparison of the one or more solution scenarios with one or more reference solution scenarios; and validating, based on the comparison, results of the one or more solution scenarios and the domain specific model thereof.

In an embodiment, the step of validating results of the one or more solution scenarios comprises determining, using the logic programming representation, one or more inconsistencies across the one or more rules in the domain specific model.

In an embodiment, the one or more hardware processors are further configured by the instructions to correct the one or more determined inconsistencies and re-generate the one or more solution scenarios to obtain one or more anomaly-free solution scenarios. In an embodiment, wherein the one or more determined inconsistencies are corrected by performing a conflict resolution check across the one or more rules.

In yet another aspect, there are provided one or more non-transitory machine readable information storage mediums comprising one or more instructions which when executed by one or more hardware processors causes a method for validating domain specific model(s). The instructions comprise receiving, via one or more hardware processors, a domain specific model comprising one or more rules and one or more vocabularies, wherein the one or more vocabularies comprise a plurality of entities and associated relationship thereof; translating, via the one or more hardware processors, the one or more rules and the one or more vocabularies into one or more machine interpretable rules and one or more machine interpretable vocabularies; processing, via the one or more hardware processors, the machine interpretable rules and the machine interpretable vocabularies to generate a logic programming representation comprising the machine interpretable rules and the machine interpretable vocabularies; generating, via the one or more hardware processors, one or more solution scenarios of the logic programming representation; and validating, via the one or more hardware processors the domain specific model using the one or more solution scenarios.

In an embodiment, the step validating the domain specific model using the one or more solution scenarios comprises: verifying the logic programming representation comprising the machine interpretable rules and the machine interpretable vocabularies using a set of test cases comprising at least one of one or more positive and one or more negative test cases represented as ground facts; performing, using test data from the ground facts, a comparison of the one or more solution scenarios with one or more reference solution scenarios; and validating, based on the comparison, results of the one or more solution scenarios and the domain specific model thereof.

In an embodiment, the step of validating results of the one or more solution scenarios comprises determining, using the logic programming representation, one or more inconsistencies across the one or more rules in the domain specific model.

The instructions may further comprise correcting the one or more determined inconsistencies and re-generating the one or more solution scenarios to obtain one or more anomaly-free solution scenarios. In an embodiment, the step of correcting the one or more determined inconsistencies comprises performing a conflict resolution check across the one or more rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As mentioned above, Model Driven Engineering (MDE) approaches necessitate verification and validation (V&V) of the models used. Balancing usability of modeling languages with verifiability of the specification presents several challenges. Embodiments of the present disclosure provide systems and methods with results using Semantics of Business Vocabulary and Business Rules (SBVR) standard as modeling notation and logic programming paradigm for verification and validation of domain models as an attempt to address these challenges, illustrated in the problem context of regulatory compliance for (business) enterprises with an example from a real-life regulation.

MDE seeks to enable development of large, complex systems using models as basis, necessitating V&V of the models. The vocabulary and business rules (e.g., business rules) of the problem domain need to be captured as the first step in model building. It is desirable that models are populated directly by subject matter experts (SMEs) to minimize errors and provide them with greater control over the specification. Usability and verifiability are therefore two key requirements from modeling languages. In practice, modeling languages that are easy to use by SMEs are less formal, and therefore harder to verify (e.g., Unified Modeling Language (UML). There are few formal modeling languages such as Alloy, Kodkod, CSP, and SAT specification languages that have automated solvers available. However, these are hard for SMEs to use and interpret for practice.

Figure 2:
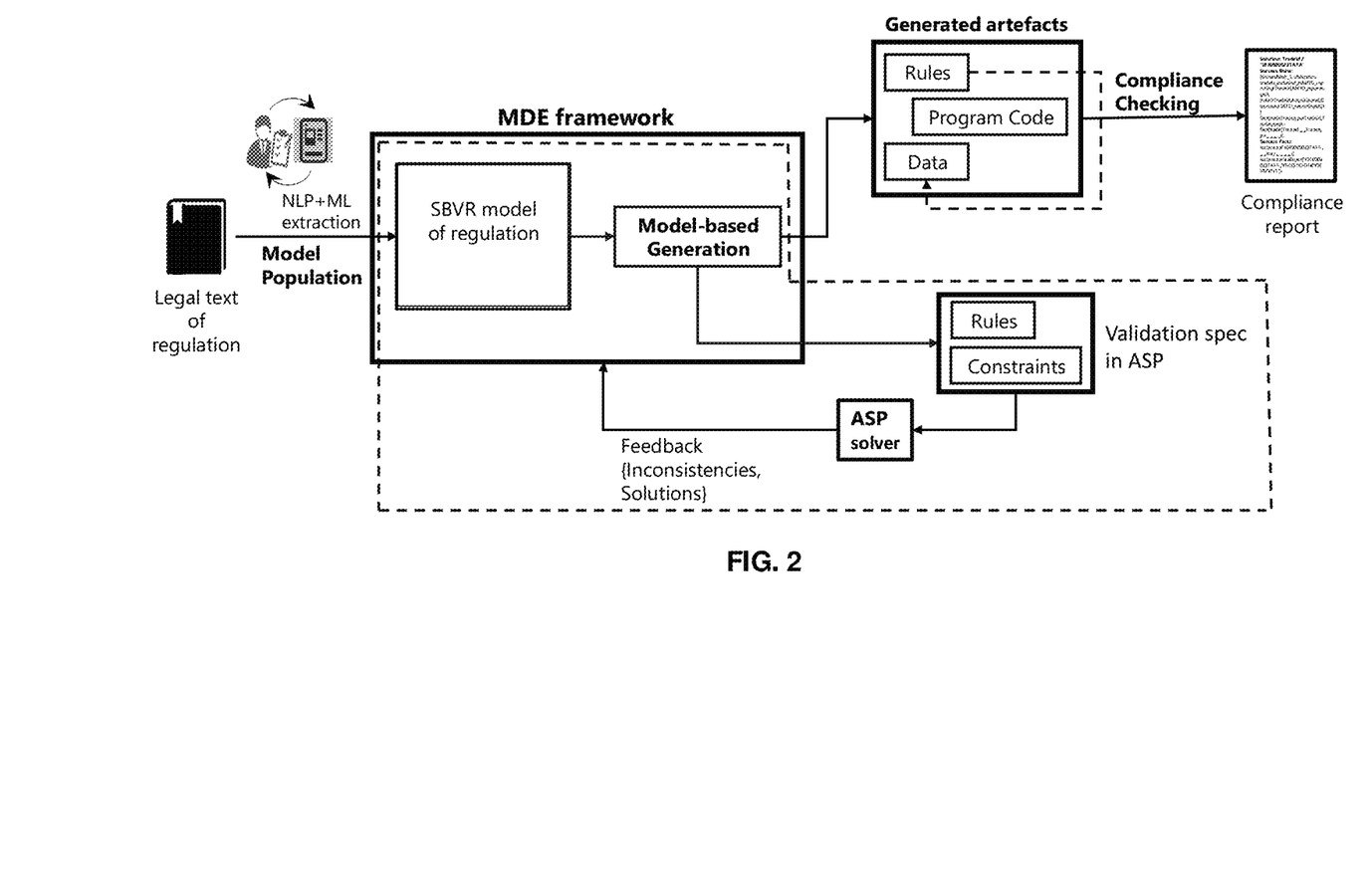
FIG. 2 illustrates an exemplary block diagram of a Model Driven Engineering (MDE) framework for verifying and validating domain specific models by system of FIG. 1, in accordance with an embodiment of the present disclosure.

There are research works where generic MDE framework are built for rule checking applied to the complex real-world problem of regulatory compliance by enterprises. Such a framework is illustrated in FIG. 2. The framework comprises three parts: a) automated extraction from natural language (NL) text of regulations to aid SMEs in authoring a model of regulation rules, b) model-based generation of formal logic specification of rules and extraction of relevant enterprise data, and c) automated checking of extracted data for rule compliance using an off-the-shelf rule engine. This framework has been extended for verification and validation of the models by the embodiments of the present disclosure and these are described herein by way of examples not be construed as limiting the scope of the present disclosure.

Direct derivation of formal logic rules from NL regulation text is not feasible, therefore controlled natural language (CNL) and a rule model are selected as logical intermediate steps. Attempto Controlled English is a CNL that translates directly to formal specification while intermediate model is needed for the above step b). Embodiments of the present disclosure have chosen SBVR, a vocabulary and rule modeling standard by Object Management Group (OMG) to build the rule model since existing Semantics of Business Vocabulary and Business Rules (SBVR) utilization is not relevant and also is an expressive notation for modeling business vocabulary and rules of any domain and b) provides a CNL interface called SBVR Structured English (SBVR SE) usable by SMEs to populate the model that is grounded in first-order logic (FOL).

Automated validation of models created using a flexible CNL notation such as SBVR SE however poses several problems. SAT solvers used in existing/conventional model validation approaches use programming paradigms that are much less expressive than SBVR. These do not support aggregates, relations, or functions. Alloy, Kodkod, and Object Control Language (OCL) support encoding of aggregates, relations and constraints but not of rules with modalities such as obligations and permissions, and default behavior with exceptions, all of which frequently occur in real-world problem contexts such as regulation, policy or contract compliance. SBVR supports these features, however validating an SBVR model using any of these languages requires implementation in terms of the language primitives, a non-trivial task. To overcome these limitations, embodiments of the present disclosure provide a system that implement verification and validation (V&V) approach for domain models built using the logic programming paradigm.

As mentioned above, the present disclosure extends MDE framework to generate the formal logic specification for V&V of domain specific model in the logic programming paradigm, as shown in FIG. 2. Model verification seeks to check that the model does what it is expected to do, usually through an implementing program. The present disclosure further implements inconsistency checking and scenario generation using a set of test cases and test data as verification and validation techniques.

The objective of model validation is to ascertain that the model is a faithful representation of the problem space. The present disclosure implements validation by having SMEs certify scenarios generated from the model for validity and coverage.

Figure 1:
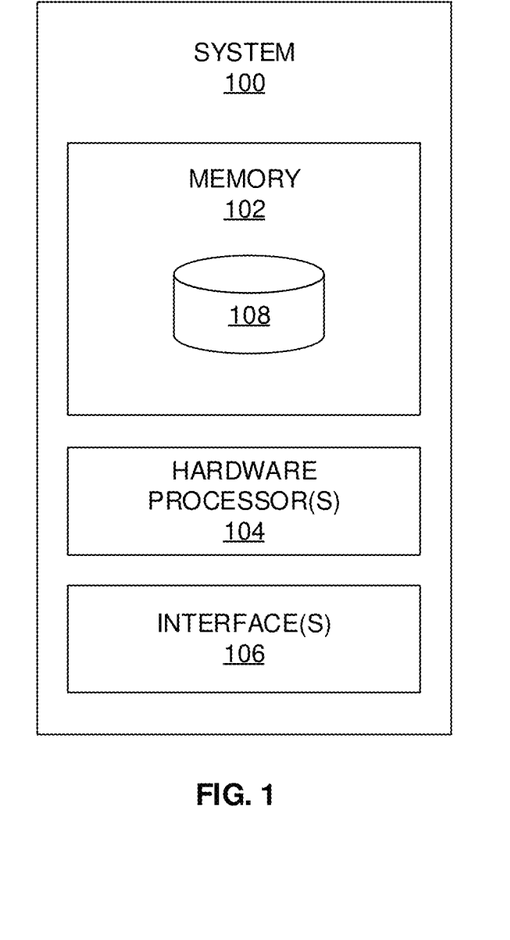
FIG. 1 illustrates an exemplary block diagram of a system for verifying and validating domain specific models, in accordance with an embodiment of the present disclosure.
Figure 3:
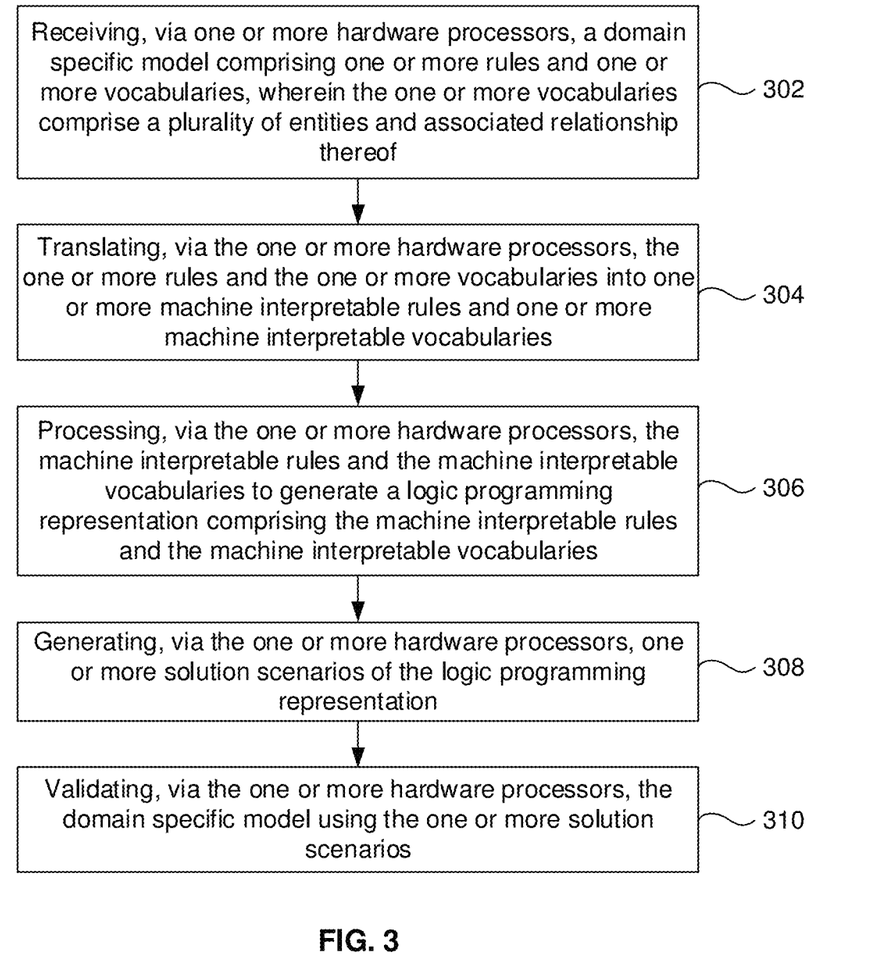
FIG. 3 illustrates an exemplary flow diagram of a method for verifying and validating domain specific models using the system of FIG. 1 in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for verifying and validating domain specific models, in accordance with an embodiment of the present disclosure. The system 100 may also be referred as 'a verification and validation system' or 'a validation system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to domain specific models that comprise rule(s) and vocabulary, and the like. More specifically, the vocabulary comprises a plurality of entities (or hierarchy of entities) and associated relationship thereof which get stored in the database 108. In an embodiment, the memory 102 may store one or more technique(s) (e.g., editors, logic programming technique, solver(s)) which when executed by the one or more hardware processors 104 perform the methodology described herein. The memory 102 may further comprise information pertaining to input(s)/output(s) of each step performed by the systems and methods of the present disclosure.

FIG. 2, with reference to FIG. 1, illustrates an exemplary block diagram of a Model Driven Engineering (MDE) framework for verifying and validating domain specific models by system of FIG. 1, in accordance with an embodiment of the present disclosure. Dash line representation block includes one or more blocks, for example, a SBVR model of regulation module that captures regulation rules and vocabularies, a model-based generation module for generating a validation specification, wherein the generated validation specification comprises rules and constraints, and a solver (e.g., ASP solver) for performing validation of domain specific models using the generated validation specification.

FIG. 3, with reference to FIG. 1, illustrates an exemplary flow diagram of a method for verifying and validating domain specific models using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, components of the MDE framework of FIG. 2 and the flow diagram as depicted in FIG. 3.

In an embodiment of the present disclosure, at step 302, the one or more hardware processors 104 receive a domain specific model comprising one or more rules and one or more vocabularies. In an embodiment, the one or more vocabularies comprise a plurality of entities and associated relationship thereof, wherein the plurality of entities are arranged in a hierarchical manner. Below are examples of rules and vocabularies occurring in a regulation from the financial domain received in raw text from end user(s), and shall not be construed as limiting the scope of the present disclosure.

1. Parameters of risk perception are clearly defined in terms of the nature of business activity, location of customer and his clients, mode of payments, volume of turnover, social and financial status etc. to enable categorisation of customers into low, medium and high risk (banks may choose any suitable nomenclature viz. level I, level II and level III).
2. For the purpose of risk categorisation, individuals (other than High Net Worth) and entities whose identities and sources of wealth can be easily identified and transactions in whose accounts by and large conform to the known profile, may be categorised as low risk.
3. Illustrative examples of low risk customers could be salaried employees whose salary structures are well defined.
4. Banks should apply enhanced due diligence measures based on the risk assessment, thereby requiring intensive 'due diligence' for higher risk customers, especially those for whom the sources of funds are not clear.
5. Other examples of customers requiring higher due diligence include (a) nonresident customers; (b) high net worth individuals; (c) trusts, charities, NGOs . . . (f) politically exposed persons (PEPs) of foreign origin.
6. Not to open an account or close an existing account where the bank is unable to apply appropriate customer due diligence measures, i.e., bank is unable to verify the identity and/or obtain documents required as per the risk categorisation due to non-cooperation of the customer or non-reliability of the data/information furnished to the bank.
7. Necessary checks before opening a new account so as to ensure that the identity of the customer does not match with any person with known criminal background or with banned entities such as individual terrorists or terrorist organisations etc.
8. Customer identification means identifying the customer and verifying his/her identity by using reliable, independent source documents, data or information
9. Required documents for salaried customer are given in annexure e.g., passport
10. Required documents for salaried customer are given in annexure e.g., PAN card etc.
11. Required docs for trusts are given in annexure, e.g., certificate of registration
12. Required docs for trusts are given in annexure such as telephone bill etc.
13. Politically exposed persons are individuals who are or have been entrusted with prominent public functions in a foreign country, e.g., Heads of States or of Governments, senior politicians, senior government/judicial/ military officers, senior executives of state-owned corporations, important political party officials, etc. Banks should gather sufficient information on any person/ customer of this category intending to establish a relationship and check all the information available on the person in the public domain.
14. It is, however, necessary to have suitable built in safeguards to avoid harassment of the customer.
15. For example, decision by a bank to close an account should be taken at a reasonably high level after giving due notice to the customer explaining the reasons for such a decision.
16. Banks should introduce a system of periodical updation of customer identification data (including photograph/s) after the account is opened.
17. The periodicity of such updation should not be less than once in five years in case of low risk category customers
18. and not less than once in two years in case of high and medium risk categories.

In the above examples of rules, vocabularies comprise entities for example, customer, client, person, politically exposed persons (PEPs), and the like.

Below are examples of corresponding rules and vocabularies encoded (by a subject matter expert (SME), based on the raw format of rules and vocabularies as mentioned above, in Controlled Natural Language (Structured English) using the rule editor (or an editor), saved automatically in the domain specific model (refer step 302) which is received by the system 100:

1. rule r_1 It is necessary that customer @is highRiskCust || customer @is lowRiskCust
2. rule r_2 It is necessary that customer @has sourceOfWealthEasilyIdentified if customer @is lowRiskCust
3. rule r_3 It is necessary that customer @is salaried if customer @has sourceOfWealthEasilyIdentified
4. rule r_4 It is necessary that customer @has sourceOfWealthNotEasilyIdentified if customer @is highRiskCust
5. rule r_5 It is necessary that customer @is trusts || customer @is pepOfForeignOrigin if customer @has sourceOfWealthNotEasilyIdentified
6. rule r_6 It is necessary that bank @opensAccountFor customer if bank @verifiesIdentityOf customer
7. rule r_7 It is necessary that bank not @opensAccountFor customer if customer @approaches bank && customer @is bannedCustomer
8. rule r_8 It is necessary that bank @verifiesIdentityOf customer if customer @approaches bank && customer @submitsReq document
9. rule r_9 It is necessary that customer @submitsReq document if customer @is salaried && document $type_value_PAN
10. rule r_10 It is necessary that customer @submitsReq document if customer @is salaried && document $type_value_aadhaar
11. rule r_11 It is necessary that customer @submitsReq document if customer @is trusts && document $type_value_telephoneBill
12. rule r_12 It is necessary that customer @submitsReq document if customer @is trusts && document $type_value_registrationCertificate
13. rule r_13 It is necessary that customer @submitsReq document if customer @is pepOfForeignOrigin && document $type_value_infoFromPublicDomain
14. rule r_14 It is necessary that bank not @harass customer
15. rule r_15 It is necessary that bank @harass customer if bank @closed account && account $isProvidedReasonForClosed_value_false
16. rule r_16 It is necessary that bank @periodicUpdationcheckOf customer if bank @UpdatedDetailsOf customer
17. rule r_17 It is necessary that bank @UpdatedDetailsOf customer if customer @is lowRiskCust && bank @opensAccountForcustomer&& customer @owns account && account $UpdatePeriod is less than 5

18. rule r_18 bank @UpdatedDetailsOf customer if customer @is highRiskCust && bank @opensAccountFor customer && customer @owns account && account $UpdatePeriod is less than 2

In an embodiment of the present disclosure, at step 304, the one or more hardware processors 104 translate, using an editor the one or more rules and the one or more vocabularies into one or more machine interpretable rules and one or more machine interpretable vocabularies. In the present disclosure, the system 100 utilizes a Structured English editor for performing the translation. The above editor is selected by the system 100 for automated verification since it supports aggregates, functions, and optimizations and b) maps directly onto domain specific fact-oriented model and underlying first-order logic formalism. Below are examples of machine interpretable rules and vocabularies comprised in the domain specific model (e.g., finance domain specific model) for the KYC example, and shall not be construed as limiting the scope of the present disclosure.

Rules in the domain specific model are translated as rules in the Answer Set programming (ASP) logic programming notation of the form Head: —Body, where Body is the antecedent that implies the consequent Head. Statement-type rules without antecedents are translated as constraints i.e., rules with empty head, as: —Body. Relations in vocabulary and rules model (or also referred as the domain specific model under consideration) become predicates in the logic programming representation, with related concepts as arguments referred by their identifiers e.g., bank@opensAccountFor customer becomes opensAccountFor(BankId,CustomerId). Model-based generator implemented by the system 100 uses Eclipse Modeling Framework (EMF) generated model traversal functions to traverse the domain specific model and translate the associated rules and vocabularies thereof to machine interpretable rules and constraints/vocabularies respectively.

This translator implemented by the present disclosure supports encoding of extended logic programs with choice, cardinality, classical negation, and disjunction in the head of rules, not supported by normal logic programs, enabling verification of these features. Disjunction in rule heads is a powerful feature used to model mutually exclusive paths, such as high and low risk categorization in rule r1 and two types of low risk customers in rule r4 seen in examples listed under rules in step 302. Classical negation allows explicit statement or derivation of negative knowledge, e.g., rule r7 seen in examples listed under rules in step 302.

Referring back to steps of FIG. 3, in an embodiment of the present disclosure, at step 306, the one or more hardware processors 104 process, using a model-based generation, the machine interpretable rules and the machine interpretable vocabularies to generate a logic programming representation comprising the machine interpretable rules and the machine interpretable vocabularies. In other words, the model-based generation technique is applied on the machine interpretable rules and vocabularies to generate (or obtain) a logic programming representation of the machine interpretable rules and the machine interpretable vocabularies. Below are examples of machine interpretable rules and vocabularies comprised in the in the ASP logic programming notation/representation (e.g., finance domain specific model) for the KYC example, and shall not be construed as limiting the scope of the present disclosure.

```
/* Rule :  r_1 */
fact(customerIsLowRiskCust(Customerid)) v
fact(customerIsHighRiskCust(Customerid)) :- fact(customer(Customerid,_,_,_,_,_)).
/* Rule :  r_2 */
fact(customerHasSourceOfWealthEasilyIdentified(Customerid,SourceOfWealthEasil
yIdentifiedid))        :-
        fact(customerIsLowRiskCust(Customerid)),sourceOfWealthEasilyIdentified(Sourc
eOfWealthEasilyIdentifiedid).
/* Rule :  r_3 */
fact(customerIsSalaried(Customerid))        :-
        fact(customerHasSourceOfWealthEasilyIdentified(Customerid,SourceOfWealthE
asilyIdentifiedid)).
%
/* Rule :  r_4 */
fact(customerHasSourceOfWealthNotEasilyIdentified(Customerid,SourceOfWealthN
otEasilyIdentifiedid))        :-
        fact(customerIsHighRiskCust(Customerid)),sourceOfWealthNotEasilyIdentified(S
ourceOfWealthNotEasilyIdentifiedid).
/* Rule :  r_5 */
fact(customerIsPepOfForeignOrigin(Customerid)) v
fact(customerIsTrusts(Customerid))  :-
        fact(customerHasSourceOfWealthNotEasilyIdentified(Customerid,SourceOfWealt
hNotEasilyIdentifiedid)).
/* Rule :  r_6 */
fact(bankOpensAccountForCustomer(Bankid,Customerid))        :-
        fact(bankVerifiesIdentityOfCustomer(Bankid,Customerid)).
/* Rule :  r_7 */
fact(rule4(Customerid,Bankid))        :-
        fact(customerApproachesBank(Customerid,Bankid)),
    fact(customerIsBannedCustomer(Customerid)).
-fact(bankOpensAccountForCustomer(Bankid,Customerid))        :-
        fact(rule4(Customerid,Bankid)).
/* Rule :  r_8 */
fact(rule5(Customerid,Bankid,Documentid)) :-
        fact(customerApproachesBank(Customerid,Bankid)),
    fact(customerSubmitsReqDocument(Customerid,Documentid)).
fact(bankVerifiesIdentityOfCustomer(Bankid,Customerid))        :-
        fact(rule5(Customerid,Bankid,Documentid)).
```

```
/* Rule :  r_9 */
fact(rule6(Customerid,Documentid))  :-       fact(customerIsSalaried(Customerid)),
fact(documentType(Documentid,pan)).
fact(documentType(Documentid,Type))          :-
    fact(document(Documentid,Type)).
fact(customerSubmitsReqDocument(Customerid,Documentid))  :-
    fact(rule6(Customerid,Documentid)).
/* Rule :  r_10 */
fact(rule7(Customerid,Documentid))  :-       fact(customerIsSalaried(Customerid)),
fact(documentType(Documentid,aadhaar)).
fact(documentType(Documentid,Type))          :-
    fact(document(Documentid,Type)).
fact(customerSubmitsReqDocument(Customerid,Documentid))  :-
    fact(rule7(Customerid,Documentid)).
/* Rule :  r_11 */
fact(rule8(Customerid,Documentid))  :-       fact(customerIsTrusts(Customerid)),
fact(documentType(Documentid,telephonebill)).
fact(documentType(Documentid,Type))          :-
    fact(document(Documentid,Type)).
fact(customerSubmitsReqDocument(Customerid,Documentid))  :-
    fact(rule8(Customerid,Documentid)).
/* Rule :  r_12 */
fact(rule9(Customerid,Documentid))  :-       fact(customerIsTrusts(Customerid)),
fact(documentType(Documentid,registrationcertificate)).
fact(documentType(Documentid,Type))          :-
    fact(document(Documentid,Type)).
fact(customerSubmitsReqDocument(Customerid,Documentid))  :-
    fact(rule9(Customerid,Documentid)).
/* Rule :  r_13 */
fact(rule10(Customerid,Documentid)):-
    fact(customerIsPepOfForeignOrigin(Customerid)),
fact(documentType(Documentid,infofrompublicdomain)).
fact(documentType(Documentid,Type))          :-
    fact(document(Documentid,Type)).
fact(customerSubmitsReqDocument(Customerid,Documentid))  :-
    fact(rule10(Customerid,Documentid)).
/* Rule :  r_14 */
:- fact(bankHarassCustomer(Bankid,Customerid)).
/* Rule :  r_15 */
fact(rule11(Bankid,Customerid,Accountid))   :-
    fact(bankClosedAccountForCustomer(Bankid,Customerid)),
fact(accountIsProvidedReasonForClosed(Accountid,false)).
fact(accountIsProvidedReasonForClosed(Accountid,IsProvidedReasonForClosed))
    :-      fact(account(Accountid,IsProvidedReasonForClosed,_)).
fact(bankHarassCustomer(Bankid,Customerid))       :-
    fact(rule11(Bankid,Customerid,Accountid)).
/* Rule :  r_16 */
fact(bankPeriodicUpdationcheckOfCustomer(Bankid,Customerid))    :-
    fact(bankUpdatedDetailsOfCustomer(Bankid,Customerid)).
/* Rule :  r_17 */
fact(rule12(Customerid,Bankid,Accountid))   :-
    fact(customerIsLowRiskCust(Customerid)),
fact(bankOpensAccountForCustomer(Bankid,Customerid)),
fact(customerOwnsAccount(Customerid,Accountid)), fact(rule13(Accountid)).
fact(accountUpdatePeriod(Accountid,UpdatePeriod))        :-
    fact(account(Accountid,_,UpdatePeriod)).
fact(rule13(Accountid)) :-  fact(accountUpdatePeriod(Accountid,UpdatePeriod)),
UpdatePeriod=<4.
fact(bankUpdatedDetailsOfCustomer(Bankid,Customerid))    :-
    fact(rule12(Customerid,Bankid,Accountid)).
/* Rule :  r_18 */
fact(rule14(Customerid,Bankid,Accountid))   :-
    fact(customerIsHighRiskCust(Customerid)),
fact(bankOpensAccountForCustomer(Bankid,Customerid)),
fact(customerOwnsAccount(Customerid,Accountid)), fact(rule15(Accountid)).
fact(accountUpdatePeriod(Accountid,UpdatePeriod))        :-
    fact(account(Accountid,_,UpdatePeriod)).
fact(rule15(Accountid)) :-  fact(accountUpdatePeriod(Accountid,UpdatePeriod)),
UpdatePeriod=<1.
    fact(bankUpdatedDetailsOfCustomer(Bankid,Customerid))   :-
fact(rule14(Customerid,Bankid,Accountid)).
```

In an embodiment of the present disclosure, at step 308, the one or more hardware processors 104 generate, using a solver, one or more solution scenarios of the logic programming representation. Examples of the one or more generated solution scenarios are provided below and shall not be construed as limiting the scope of the present disclosure.

| Solution Scenario 1 |
|---|
| »{fact(document(108,aadhaar)),fact(document(108,pan)),fact(account(109,true,1)), ... ... ... ... ... ... ... fact(customerOwnsAccount(102,109)),fact(bankClosedAccountForCustomer(106,102)),fact(customerApproachesBank(102,106), ... .....,fact(documentType(108,aadhaar)),fact(documentType(108,pan)),fact(accountIsProvidedReasonForClosed(109,true)),fact(customerIsLowRiskCust(102)),fact(customerHasSourceOfWealthEasilyIdentified(102,111)),fact(customerIsSalaried(102)),fact(rule6(102,108)),fact(rule7(102,108)),fact(customerSubmitsReqDocument(102,108)),fact(rule5(102,106,108)),fact(bankVerifiesIdentityOfCustomer(106,102)),fact(bankOpensAccountForCustomer(106,102))... ... ... ..} |

| Solution Scenario 2 |
|---|
| » { fact(document(108,telephonebill)), fact(account(109,true,1)), fact(customerOwnsAccount(102,109)), fact(bankClosedAccountForCustomer(106,102)),fact(customerApproachesBank(102,106)), ... ... ... ... ... ,fact(documentType(108,telephonebill)),fact(accountIsProvidedReasonForClosed(109,true)),fact(customerIsHighRiskCust(102)),fact(customerHasSourceOfWealthNotEasilyIdentified(102,111)),fact(customerIsTrusts(102)),fact(rule8(102,108)),fact(rule9(102,108)),fact(customerSubmitsReqDocument(102,108)),fact(rule5(102,106,108)),fact(bankVerifiesIdentityOfCustomer(106,102)),fact(bankOpensAccountForCustomer(106,102)),... ... ... ...} |

| Solution Scenario 3 |
|---|
| »{ fact(document(108,infofrompublicdomain)), fact(document(108,aadhaar)), fact(account(109,true,1)) , fact(customerOwnsAccount(102,109)),fact(bankClosedAccountForCustomer(106,102)),fact(customerApproachesBank(102,106)),fact(documentType(108,infofrompublicdomain)),... ... ... ... ... ... ... ... ,fact(accountIsProvidedReasonForClosed(109,true)),fact(customerIsHighRiskCust(102)),fact(customerHasSourceOfWealthNotEasilyIdentified(102,111)),fact(customerIsPepOfForeignOrigin(102)),fact(rule10(102,108)),fact(customerSubmitsReqDocument(102,108)),fact(rule5(102,106,108)),fact(bankVerifiesIdentityOfCustomer(106,102)), fact(bankOpensAccountForCustomer(106,102)),... ... ... ... ... ... ... ...} |

In an embodiment of the present disclosure, at step 310, the one or more hardware processors 104 validate the domain specific model using the one or more solution scenarios as described as examples. In an embodiment of the present disclosure, the domain specific model is validated using the one or more solution scenarios by: verifying the logic programming representation comprising the machine interpretable rules and the machine interpretable vocabularies using a set of test cases comprising at least one of one or more positive and one or more negative test cases represented as ground facts; performing, using test data from the ground facts which are indicative of one or more reference solution scenarios, a comparison of the one or more solution scenarios with the one or more reference solution scenarios; and validating, based on the comparison, results of the one or more solution scenarios and the domain specific model thereof. In other words, the logic programming representation comprising the machine interpretable rules and the machine interpretable vocabularies are verified using a set of test cases comprising at least one of one or more positive and one or more negative test cases represented as ground facts, thereby validating the domain specific model. In an embodiment, the ground facts can either by provided by one or more subject matter experts (SMEs) or the system 100 can automatically generate these. Below are examples of ground facts provided to the ASP solver (as depicted in FIG. 2) and these shall not be construed as limiting the scope of the present disclosure.

Ground facts:
fact(account(112,true,1)). % isProvidedReasonForClosed
% fact(customerIsBannedCustomer(102)).
fact(customerOwnsAccount(102,109)).
fact(bankClosedAccountForCustomer(106,102)).
fact(customerApproachesBank(102,106)).
fact(document(108, telephoneBill)).
fact(document(108, infoFromPublicDomain)).
fact(document(108, aadhaar)).
fact(document(108, registrationCertificate)).
fact(document(108, pan)).

Although minimal, number of logic programming representation(s) can grow combinatorially with conditions and ground instances (or ground facts). To constrain number of solution scenarios, only critically important conditions are modeled as disjunctions that create independent solution scenarios for each condition, while non-critical conditions such as id proof submitted by a customer e.g., Permanent Account Number (PAN), and the like are modeled as normal clauses and minimal number of ground facts are provided to prevent combinatorial explosion. This enables the system 100 to accurately verify and validate the domain specific model and less prone to error.

During the validation of results of the one or more generated solution scenarios the system 100 also is configured to determine, using the logic programming representation, one or more inconsistencies across the one or more rules in the domain specific model, and correct the one or more determined inconsistencies (by performing conflict resolution check across the rules). Below is an example of conflict scenario in rules and a way of how rules can be corrected and these shall not be construed as limiting the scope of the present disclosure:

Conflict check and how the rules can be corrected:
Introducing the fact:
fact(customerIsBannedCustomer(102)) introduces inconsistency which conflicts with opening account.
This is suggested as:
Facts derived to be true in every answer set:
. . . ,-bankOpensAccountForCustomer(102,106).

The system 100 further suggests on how a particular rule can be corrected which is provided by way of example below:
Suggestion is that bankOpensAccountForCustomer(105, 106) should not occur which is shown as below
:-bankOpensAccountForCustomer(105,106).

Another example of constraint violation and how the rules can be corrected: Rule 14 is a constraint and rule 15 is causal rule specifying what the constraint mean. A constraint cannot be violated where as a causal rule can be. Changing the fact: account(109,true,1) to account(109,false,1) results in customer getting harassed which violates the constraint.
% The following constraint will always be violated
%:-fact(bankHarassesCustomer(_0,_1)).
% so this program does not have any answer set.

Upon correcting the inconsistencies in rule(s), the solution scenarios are re-generated to obtain anomaly-free solution scenarios.

Editors/solver as implemented by the present disclosure perform automated analysis by grounding the program i.e., generating variable-free rules given a set of ground facts and using techniques similar to SAT solving to generate solutions or logic programming representation(s). In the present disclosure, the systems and methods utilizes DLV system as the solver for the generated logic programming representation. The solver performs consistency checking of the rule base, indicating conflicting rules or constraints and generates logic programming representation of the machine interpretable rules and vocabularies respectively, for paths where no conflicts exist. Logic programming representation can be minimal, i.e., no logic programming representation can be contained in another, and represent the minimal set of unique solution scenarios for the input domain specific model. These are presented to SMEs to check whether the generated scenarios are valid and whether all important scenarios have been covered. DLV system (also referred as DataLog with Disjunction, where the logical disjunction symbol V is used) is a disjunctive logic programming system, implementing stable model under the logic programming representation paradigm.

Upon implementing the systems and methods of the present disclosure on sections from three real-life regulations, several groups of SMEs who found SBVR SE to be an easily usable notation to understand and specify rules without requiring knowledge of underlying technologies were trained. It is observed through the above training and experiments that using a (general-purpose) CNL and model saves the effort of implementing a DSL, also keeps the approach generic and usable for any problem domain. CNL being more flexible, verification is harder than in case of a DSL.

It was further realized that language implementation tool utilized by the system placed some restrictions on sentence structure and keywords for ease of verification, however ensured to not compromise on feature support. It is desirable that V&V ensures that specified rules form a correct inferencing hierarchy. The steps to be performed for verification is compensated by other advantages of the SBVR-ASP combination mentioned earlier, also minimal translation effort from SBVR to machine interpretable rules and vocabularies using the solver (e.g., ASP Solver). The above method described by the present disclosure also helps identify and map to actual data if available, else generate mock data through which model validation can be performed.

As mentioned above, usability and verifiability of modeling languages are both critical in any MDE approach, however often conflict in practice. The present disclosure provides systems and methods for validating domain specific models using CNL as a stepping stone to populate models wherein challenges faced in verification of such a model were reviewed using commonly used model checking languages. The V&V approach of the present disclosure were herein described using SBVR and ASP to address these challenges and illustrated with an example from the KYC regulation for financial institutions.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   receiving, via one or more hardware processors, a domain specific model comprising one or more rules and one or more vocabularies, wherein the one or more vocabularies comprise a plurality of entities and associated relationship thereof, wherein the plurality of entities is arranged in a hierarchical manner;
   translating, via the one or more hardware processors, the one or more rules and the one or more vocabularies into one or more machine interpretable rules and one or more machine interpretable vocabularies, wherein each rule of the one or more machine interpretable rules is represented in a format comprising a head and a body, and wherein the one or more rules with empty head are translated as constraints;
   processing, via the one or more hardware processors, the machine interpretable rules and the machine interpretable vocabularies to generate a logic programming representation comprising the machine interpretable rules and the machine interpretable vocabularies, wherein the associated relationship in the domain specific model become predicates in the logic programming representation, with related concepts as arguments represented by their identifiers;
   generating, via the one or more hardware processors, one or more solution scenarios of the logic programming representation, by modelling critical conditions in the machine interpretable rules as disjunctions; and
   validating, via the one or more hardware processors the domain specific model using the one or more solution scenarios.

2. The processor implemented method of claim 1, wherein validating the domain specific model using the one or more solution scenarios comprises:
   verifying the logic programming representation comprising the machine interpretable rules and the machine interpretable vocabularies using a set of test cases comprising at least one of one or more positive and one or more negative test cases represented as ground facts;
   performing, using test data from the ground facts, a comparison of the one or more solution scenarios with one or more reference solution scenarios; and
   validating, based on the comparison, results of the one or more solution scenarios and the domain specific model thereof.

3. The processor implemented method of claim 2, wherein validating results of the one or more solution scenarios comprises determining, using the logic programming representation, one or more inconsistencies across the one or more rules in the domain specific model.

4. The processor implemented method of claim 3, further comprising correcting the one or more determined inconsistencies and re-generating the one or more solution scenarios to obtain one or more anomaly-free solution scenarios.

5. The processor implemented method of claim 4, wherein correcting the one or more determined inconsistencies comprises performing a conflict resolution check across the one or more rules.

6. A system, comprising:
   a memory storing instructions;
   one or more communication interfaces; and
   one or more hardware processors coupled to the memory via the one or more communication interfaces, wherein the one or more hardware processors are configured by the instructions to:
   receive a domain specific model comprising one or more rules and one or more vocabularies, wherein the one or more vocabularies comprise a plurality of entities and associated relationship thereof, wherein the plurality of entities is arranged in a hierarchical manner;
   translate, using an editor, the one or more rules and the one or more vocabularies into one or more machine interpretable rules and one or more machine interpretable vocabularies, wherein each rule of the one or more machine interpretable rules is represented in a format comprising a head and a body, and wherein the one or more rules with empty head are translated as constraints;
   process, using a model-based generation technique, the machine interpretable rules and the machine interpretable vocabularies to generate a logic programming representation comprising the machine interpretable rules and the machine interpretable vocabularies, wherein the associated relationship in the domain specific model become predicates in the logic programming representation, with related concepts as arguments represented by their identifiers;

generate, using a solver, one or more solution scenarios of the logic programming representation comprising the machine interpretable rules and the machine interpretable vocabularies, by modelling critical conditions in the machine interpretable rules as disjunctions; and validate the domain specific model using the one or more solution scenarios.

7. The system of claim 6, wherein the domain specific model is validated by:

verifying the logic programming representation comprising the machine interpretable rules and the machine interpretable vocabularies using a set of test cases comprising at least one of one or more positive and one or more negative test cases represented as ground facts;

performing, using test data from the ground facts, a comparison of the one or more solution scenarios with one or more reference solution scenarios; and validating, based on the comparison, results of the one or more solution scenarios and the domain specific model thereof.

8. The system of claim 7, wherein validating results of the one or more solution scenarios comprises determining, using the logic programming representation, one or more inconsistencies across the one or more rules in the domain specific model.

9. The system of claim 8, wherein the one or more hardware processors are further configured by the instructions to correct the one or more determined inconsistencies and re-generate the one or more solution scenarios to obtain one or more anomaly-free solution scenarios.

10. The system of claim 9, wherein the one or more determined inconsistencies are corrected by performing a conflict resolution check across the one or more rules.

11. One or more non-transitory machine readable information storage media storing instructions which, when executed by one or more hardware processors, causes the one or more hardware processors to perform a method for validating one or more domain specific models by:

receiving, via the one or more hardware processors, a domain specific model comprising one or more rules and one or more vocabularies, wherein the one or more vocabularies comprise a plurality of entities and associated relationship thereof, wherein the plurality of entities is arranged in a hierarchical manner;

translating, via the one or more hardware processors, the one or more rules and the one or more vocabularies into one or more machine interpretable rules and one or more machine interpretable vocabularies, wherein each rule of the one or more machine interpretable rules is represented in a format comprising a head and a body, and wherein the one or more rules with empty head are translated as constraints;

processing, via the one or more hardware processors, the machine interpretable rules and the machine interpretable vocabularies to generate a logic programming representation comprising the machine interpretable rules and the machine interpretable vocabularies, wherein the associated relationship in the domain specific model become predicates in the logic programming representation, with related concepts as arguments represented by their identifiers;

generating, via the one or more hardware processors, one or more solution scenarios of the logic programming representation, by modelling critical conditions in the machine interpretable rules as disjunctions; and validating, via the one or more hardware processors the domain specific model using the one or more solution scenarios.

12. The one or more non-transitory machine readable information storage media of claim 11, wherein validating the domain specific model using the one or more solution scenarios comprises:

verifying the logic programming representation comprising the machine interpretable rules and the machine interpretable vocabularies using a set of test cases comprising at least one of one or more positive and one or more negative test cases represented as ground facts;

performing, using test data from the ground facts, a comparison of the one or more solution scenarios with one or more reference solution scenarios; and validating, based on the comparison, results of the one or more solution scenarios and the domain specific model thereof.

13. The one or more non-transitory machine readable information storage media of claim 12, wherein validating results of the one or more solution scenarios comprises determining, using the logic programming representation, one or more inconsistencies across the one or more rules in the domain specific model.

14. The one or more non-transitory machine readable information storage media of claim 13, wherein the method further comprises correcting the one or more determined inconsistencies and re-generating the one or more solution scenarios to obtain one or more anomaly-free solution scenarios.

15. The one or more non-transitory machine readable information storage media of claim 14, wherein correcting the one or more determined inconsistencies comprises performing a conflict resolution check across the one or more rules.

* * * * *